(12) United States Patent
Kwon

(10) Patent No.: US 8,810,919 B2
(45) Date of Patent: Aug. 19, 2014

(54) CAMERA MODULE

(75) Inventor: Jonghoon Kwon, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/561,994

(22) Filed: Jul. 30, 2012

(65) Prior Publication Data

US 2013/0050845 A1 Feb. 28, 2013

(30) Foreign Application Priority Data

Aug. 31, 2011 (KR) ........................ 10-2011-0087682

(51) Int. Cl.
G02B 7/02 (2006.01)
G02B 15/14 (2006.01)

(52) U.S. Cl.
USPC ........... 359/698; 359/694; 359/697; 359/823; 396/104; 396/89; 348/144; 348/348; 348/345

(58) Field of Classification Search
USPC .................. 359/694–698, 823; 348/345, 348, 348/E5.045, 223.1, 229.1; 396/89, 104, 123
See application file for complete search history.

(56) References Cited

U.S. PATENT DOCUMENTS

| 4,523,827 | A | * | 6/1985 | Masunaga et al. | ............. | 396/96 |
| 6,130,705 | A | * | 10/2000 | Lareau et al. | ................ | 348/144 |
| 7,609,958 | B2 | * | 10/2009 | Border et al. | ................... | 396/89 |
| 2013/0135517 | A1 | * | 5/2013 | Lee | .............................. | 348/345 |

* cited by examiner

Primary Examiner — Loha Ben
(74) Attorney, Agent, or Firm — Birch, Stewart, Kolasch & Birch, LLP

(57) ABSTRACT

An apparatus and method for auto focusing camera module includes a DFoV value measurer measuring a DFoV value of a lens; storage stored with a designed DFoV value of a lens, a controller comparing the DFoV value of a lens measured by the DFoV value measurer with the designed DFoV value of a lens stored in the storage to recognize an initial position of a lens, and a lens mover focusing the lens by winding the lens or by unwinding the lens in response to the initial position of the lens recognized by the controller.

6 Claims, 5 Drawing Sheets

CAMERA MODULE

Pursuant to 35 U.S.C. §119 (a), this application claims the benefit of earlier filing date and right of priority to Korean Patent Application No. 10-2011-0087682, filed on Aug. 31, 2011, the contents of which is hereby incorporated by reference in their entirety.

BACKGROUND OF THE DISCLOSURE

1. Field

The teachings in accordance with the exemplary embodiments of this present disclosure generally relate to an apparatus and method for auto focusing camera module.

2. Background

A camera module captures an optical image of an object through a lens on an image sensor and obtains an image of the object. Recently, the camera module is mounted on a variety of electronic devices including a mobile terminal to perform multiple functions.

An auto focusing performance in the camera module is a core technical element that affects reliability of the device. For easy operation by users, the camera module is equipped with an auto focusing function, with which focus is automatically made by an installed electronic device in order to prevent the focus of an object from being blurry when the lens is pointed to the object. That is, the auto focusing is a function that finds an optimal image focusing spot with position information of the lens and image information of an image sensor and then positions the lens to the spot.

One known art in the related field, Korea Patent Publication No. 2011-0055963 discloses a method and device for automatically adjusting a focus of a camera module capable of shortening focus control time by first scanning a focus distance adjacent to a hyper focal distance, and determining a scan direction based on a focus value obtained as a result of a scan result. As noted, technical development to focusing of a camera module is continuously waged, such that a further advanced technical development is required.

SUMMARY

The present disclosure has been made to solve the foregoing problems of the prior art and therefore an object of certain embodiments of the present disclosure is to provide an apparatus for auto focusing camera module configured to perform an auto focusing to a precise direction, and a method thereof.

Technical subjects to be solved by the present disclosure are not restricted to the above-mentioned description, and any other technical problems not mentioned so far will be clearly appreciated from the following description by the skilled in the art. That is, the present disclosure will be understood more easily and other objects, characteristics, details and advantages thereof will become more apparent in the course of the following explanatory description, which is given, without intending to imply any limitation of the disclosure, with reference to the attached drawings.

An object of the invention is to solve at least one or more of the above problems and/or disadvantages in whole or in part and to provide at least advantages described hereinafter. In order to achieve at least the above objects, in whole or in part, and in accordance with the purposes of the disclosure, as embodied and broadly described, and in an exemplary embodiment of the present disclosure, there is provided an apparatus for auto focusing a camera module. The apparatus has a DFoV value measurer measuring a DFoV value of a lens, a storage storing a designed DFoV value of a lens, a controller comparing the measured DFoV value of a lens with the designed DFoV value of a lens stored in the storage to recognize an initial position of a lens, and a lens mover focusing the lens by moving the lens in response to the initial position of the lens recognized by the controller. The lens is moved by winding or unwinding, as will be described later.

Preferably, but not necessarily, the lens mover focuses the lens by unwinding the lens when the measured DFoV value of the lens is greater than the stored DFoV value by receiving a control signal of the controller.

Preferably, but not necessarily, the measured DFoV value of the lens indicates that the focal point is positioned at an upper surface discrete from a sensor surface when the measured DFoV value of the lens is greater than the stored DFoV value.

Preferably, but not necessarily, the lens mover focuses the lens by winding the lens when the measured DFoV value of the lens is smaller than the stored DFoV value.

Preferably, but not necessarily, the measured DFoV value of the lens indicates that the focal point is positioned underneath the sensor surface when the measured DFoV value of the lens is smaller than the stored DFoV value.

In an exemplary embodiment of the present invention, there is provided a method for auto focusing camera module. The method includes measuring a DFoV value of a lens, recognizing an initial position of a lens by comparing the measured DFoV value of a lens with a stored DFoV value of a lens, and focusing the lens by moving the lens.

Preferably, but not necessarily, the step of comparing the measured DFoV value of a lens with the stored DFoV value of a lens includes determining whether the measured DFoV value of the lens is greater than the stored DFoV value.

Preferably, but not necessarily, focusing is performed by unwinding the lens when the measured DFoV value of the lens is greater than the stored DFoV value.

Preferably, but not necessarily, the measured DFoV value of the lens indicates that the focal point is positioned at an upper surface discrete from a sensor surface when the measured DFoV value of the lens is greater than the stored DFoV value.

Preferably, but not necessarily, the focusing is performed by winding the lens when the measured DFoV value of the lens is smaller than the stored DFoV value.

Preferably, but not necessarily, the measured DFoV value of the lens indicates that the focal point is positioned underneath the sensor surface when the measured DFoV value of the lens is smaller than the stored DFoV value.

The apparatus and method for auto focusing camera module according to the exemplary embodiments of the present disclosure have an advantageous effect in that focusing can be performed to an accurate direction by comparing a measured DFoV value of a lens with a designed DFoV value of a lens stored in storage.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, these exemplary embodiments are provided so that this description will be thorough and complete, and will fully convey the scope of the present inventive concept to those skilled in the art.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Descriptions of well-known components and processing techniques are omitted so as to not unnecessarily obscure the embodiments of the disclosure. Like numerals refer to like elements throughout.

Hereinafter, an apparatus and method for auto focusing camera module according to the exemplary embodiments of the present disclosure will be described in detail with reference to the accompanying drawings.

Figure 1:
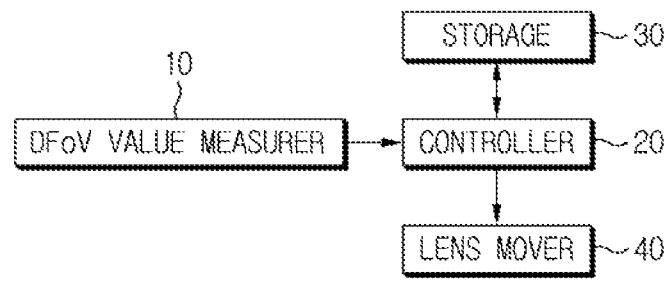
FIG. 1 is a schematic block diagram illustrating an apparatus for auto focusing camera module according to an exemplary embodiment of the present disclosure.
Figure 2:
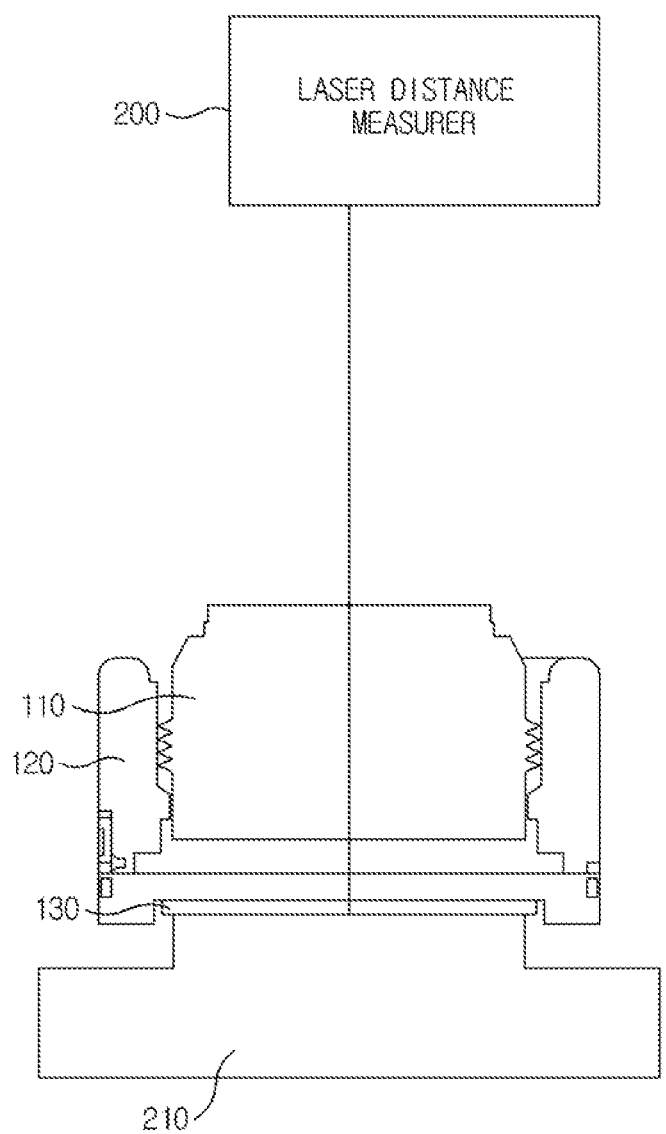
FIG. 2 is a schematic view illustrating an apparatus for auto focusing camera module according to a comparative exemplary embodiment of the present invention.

FIG. 1 is a schematic block diagram illustrating an apparatus for auto focusing camera module according to an exemplary embodiment of the present disclosure, and FIG. 2 is a schematic view illustrating an apparatus for auto focusing camera module according to a comparative exemplary embodiment of the present invention.

The apparatus for auto focusing camera module according to an exemplary embodiment of the present disclosure includes a DFoV {Display(ed) Field of View} value measurer (10) measuring a DFoV value of a lens; storage (30) stored with a designed DFoV value of a lens; a controller (20) comparing the DFoV value of a lens measured by the DFoV value measurer (10) with the designed DFoV value of a lens stored in the storage (30) to recognize an initial position of a lens; and a lens mover (40) focusing the lens by winding the lens or by unwinding the lens in response to the initial position of the lens recognized by the controller (20).

Thus, the apparatus for auto focusing camera module according to an exemplary embodiment of the present disclosure is such that the DFoV value measurer (10) measuring a DFoV value of a lens, and the controller (20) compares the DFoV value of a lens measured by the DFoV value measurer (10) with the designed DFoV value of a lens stored in the storage (30) to recognize an initial position of a lens. Furthermore, the lens mover (40) focuses the lens by winding the lens or by unwinding the lens in response to the initial position of the lens recognized by the controller (20).

To be more specific, the lens mover (40) receives a control signal of the controller (20) to focus the lens by unwinding the lens, in a case where the measured DFoV value of the lens is greater than the stored DFoV value, and to focus the lens by winding the lens, in a case where the measured DFoV value of the lens is smaller than the stored DFoV value.

Meanwhile, referring to FIG. 2, the apparatus for auto focusing camera module according to a comparative exemplary embodiment of the present invention is such that a laser distance measurer (200) is utilized to measure a height of a lens (110), whereby a degree of unwinding the lens is determined to perform the focusing by winding the lens (110). At this time, measurement is carried out by placing the camera module on a socket base (210), such that there is generated a large deviation of lens value due to socket base (210) tolerance or module tolerance to unwind the lens and to reduce accuracy in focusing regardless of an actual lens distance.

Thus, the apparatus for auto focusing camera module according to an exemplary embodiment of the present invention, in comparison with the comparative example, can advantageously function to recognize the initial position by comparing the measured DFoV value with the stored designed DFoV value, whereby focusing to an accurate direction can be performed. For reference, reference numeral '120' in FIG. 2 is an actuator moving the lens (110), and reference numeral '130' is an image sensor. The actuator moves the lens by engaging the screw threads to move the lens. The moving of the lens toward and away from the sensor 130 is referred to as winding and unwinding the lens.

Figure 3:
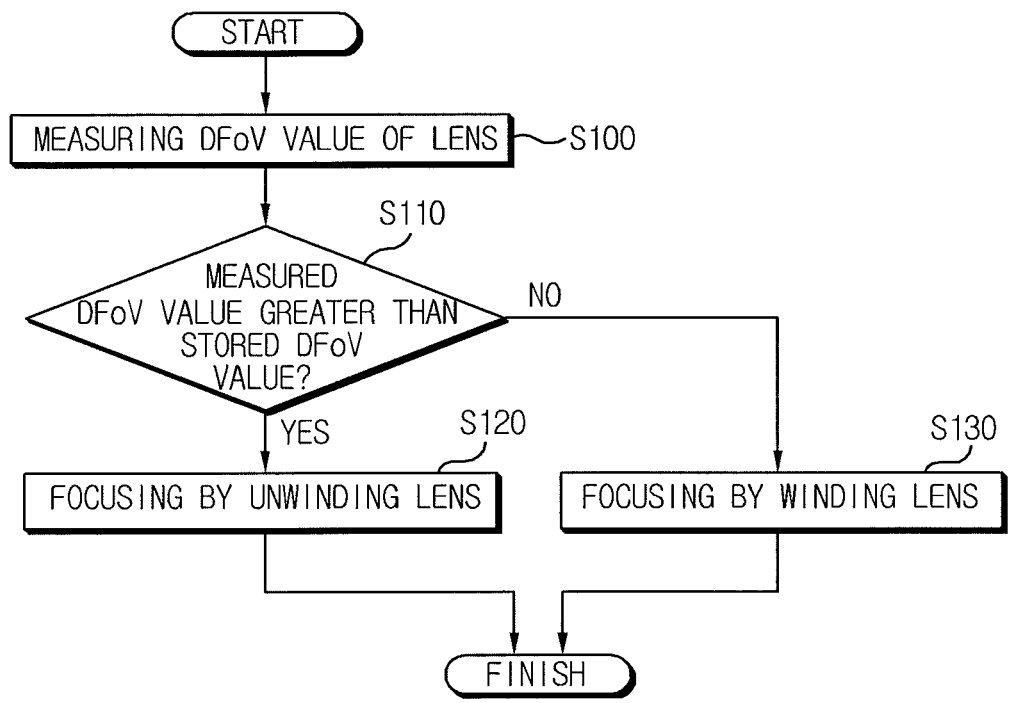
FIG. 3 is a schematic flowchart illustrating a method for auto focusing camera module according to an exemplary embodiment of the present disclosure.

FIG. 3 is a schematic flowchart illustrating a method for auto focusing camera module according to an exemplary embodiment of the present disclosure.

The method for auto focusing camera module according to an exemplary embodiment of the present disclosure includes measuring a DFoV value of a lens, recognizing an initial position of the lens by comparing the measured DFoV value of the lens with a stored DFoV value of a lens, and focusing the lens by unwinding the lens in response to the recognized initial position of the lens, or focusing the lens by winding the lens.

That is, as illustrated in FIG. 3, the method for auto focusing camera module according to an exemplary embodiment of the present disclosure is to first measure a DFoV value of a lens (S100), to recognize an initial position of the lens by comparing the measured DFoV value of the lens with a stored DFoV value of a lens (S110), to focus the lens by unwinding the lens, in a case where the measured DFoV value of the lens is greater than the stored DFoV value (S120), and to focus the lens by winding the lens, in a case where the measured DFoV value of the lens is smaller than the stored DFoV value (S130).

At this time, the step of comparing the measured DFoV value of a lens with the stored DFoV value of a lens includes determining at S110 whether the measured DFoV value of the lens is greater than the stored DFoV value, and recognizing the initial position of the lens in response to a case where the measured DFoV value of the lens is greater than the stored DFoV value, and to a case where the measured DFoV value of the lens is smaller than the stored DFoV value, as a result of the determination at S110.

Figure 4:
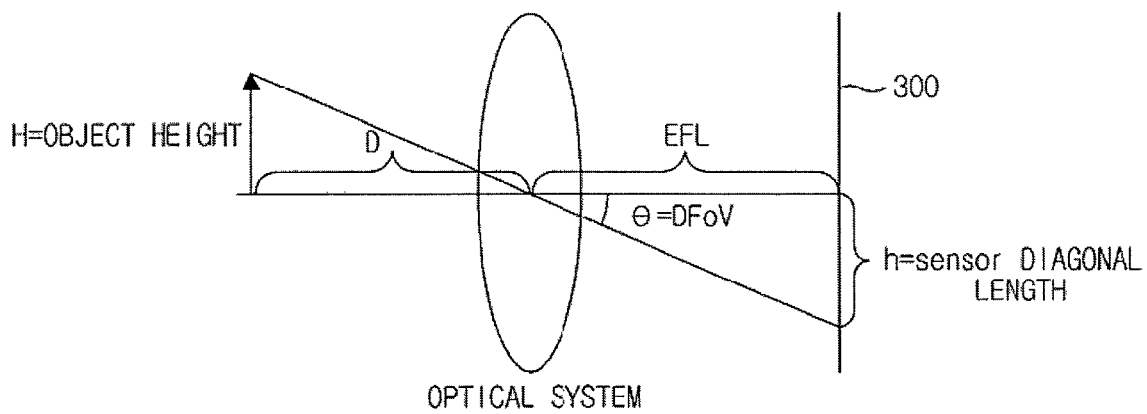
FIG. 4 is a schematic conceptual view illustrating a method for auto focusing camera module according to an exemplary embodiment of the present disclosure.

FIG. 4 is a schematic conceptual view illustrating a method for auto focusing camera module according to an exemplary embodiment of the present disclosure.

A concept of the method for auto focusing camera module according to an exemplary embodiment of the present disclosure may be derived from the following Equation 1 in relation to a DFoV and an EFL (Effective Focal Length).

$$h = EFL * \tan \Theta \quad \text{[Equation 1]}$$

where, 'h' is a diagonal length of a sensor, 'EFL' is a focal length or a lens position, and 'Θ' is a DFoV.

Thus, position change in lens can be calculated by change in DFoV. At this time, the diagonal length of the sensor 'h' is a fixed value, such that the lens position of 'EFL' and the DFoV of 'Θ' are in reverse proportion. As a result, as a lens position increases, the 'EFL' increases, and the DFoV of 'Θ' decreases, and as the lens position decreases, the 'EFL' decreases and the DFoV of 'Θ' increases.

Reference numeral '300' in FIG. 4 is a plane surface of an image sensor.

Figure 5:
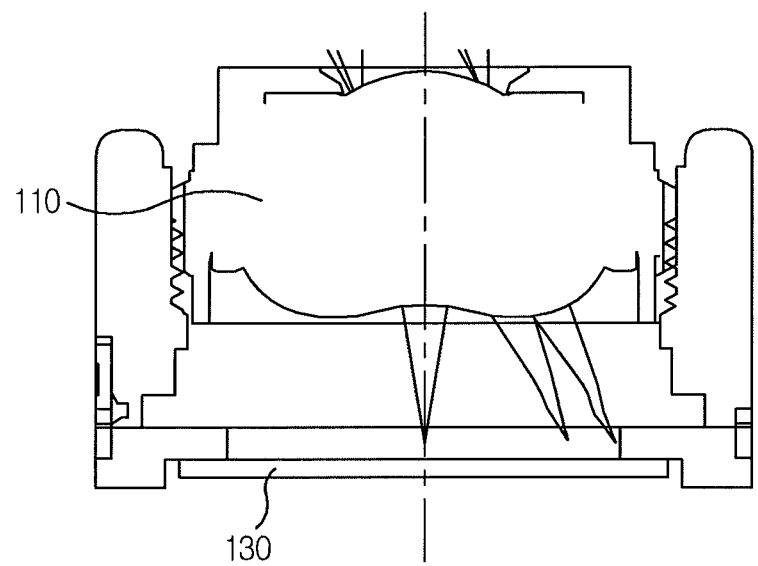
FIG. 5 is a schematic view illustrating a DFoV value measured by an apparatus for auto focusing camera module according to an exemplary embodiment of the present invention.
Figure 6:
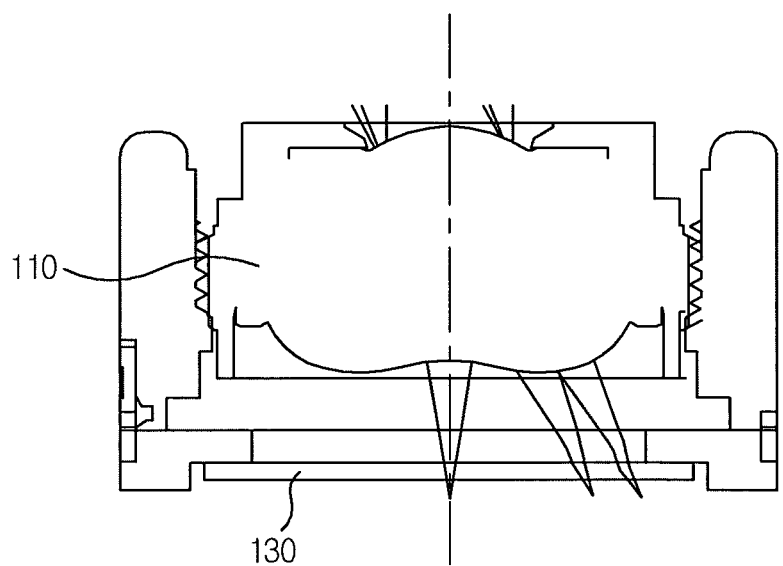
FIG. 6 is a schematic view illustrating a DFoV value measured by an apparatus for auto focusing camera module according to another exemplary embodiment of the present invention.
Figure 7:
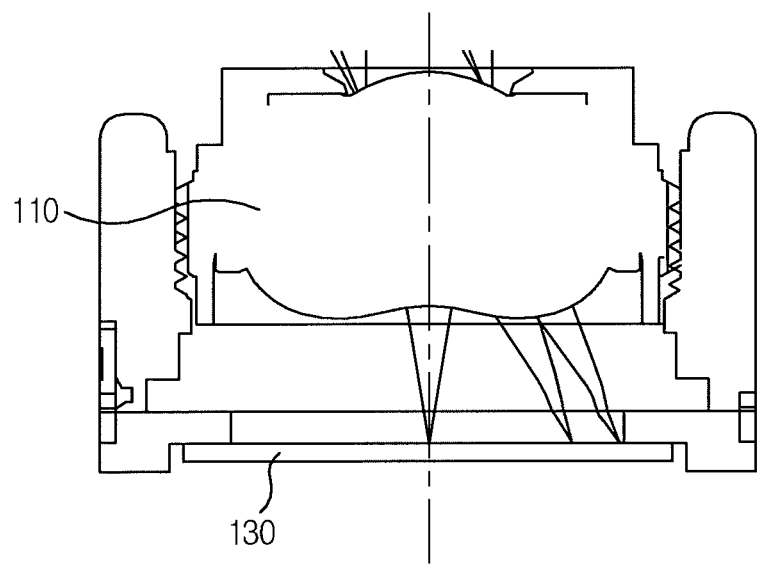
FIG. 7 is a schematic view illustrating an auto focused state of a camera module according to an exemplary embodiment of the present invention.

FIG. 5 is a schematic view illustrating a DFoV value measured by an apparatus for auto focusing camera module according to an exemplary embodiment of the present invention, FIG. 6 is a schematic view illustrating a DFoV value measured by an apparatus for auto focusing camera module according to another exemplary embodiment of the present invention, and FIG. 7 is a schematic view illustrating an auto focused state of a camera module according to an exemplary embodiment of the present invention.

As mentioned above, the method for auto focusing camera module according to an exemplary embodiment of the present disclosure is to measure a DFoV value of a lens, and to recognize an initial position of the lens by comparing the measured DFoV value of the lens with a stored DFoV value of a lens.

At this time, as illustrated in FIG. 5, the focusing is performed by winding the lens when measured DFoV value of the lens indicates that the focal point is positioned at an upper surface discrete from a sensor surface to make the measured DFoV value of the lens smaller than the stored DFoV value.

Therefore, as illustrated in FIG. 6, the focusing is performed by unwinding the lens when the measured DFoV value of the lens indicates that the focal point is positioned underneath the sensor surface to make the measured DFoV value of the lens greater than the designed DFoV value. The focusing is completed where a focal point is positioned on the sensor surface through these steps. In that case, the measured DFoV value of the lens is equal to the designed DFoV value.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

The apparatus and method for auto focusing camera module according to exemplary embodiments of the present invention has an industrial applicability in that focusing can be performed to an accurate direction by comparing a measured DFoV value of a lens with a designed DFoV value of a lens stored in storage.

What is claimed is:

1. An apparatus for auto focusing a camera module, the apparatus comprising:
   a memory configured to store a prescribed Displayed Field of View (DFoV) of a lens of the camera module, the prescribed DFoV corresponding to a prescribed position of the lens being preset in the memory;
   a determination unit configured to determine a current DFoV of the lens;
   a controller configured to compare the current DFoV with the prescribed DFoV stored in the memory and determine a current position of the lens corresponding to the current DFoV, a position of the lens being changed according to DFoV of the lens; and
   a lens mover configured to adjust focus of the lens based on the current position of the lens.

2. The apparatus of claim 1, wherein the lens mover is further configured to adjust the focus of the lens by distancing the lens from an image sensor of the camera module when the current DFoV is greater than the prescribed DFoV.

3. The apparatus of claim 1, wherein the lens mover is further configured to adjust the focus of the lens by placing the lens proximate to an image sensor when the current DFoV is smaller than the prescribed DFoV.

4. A method for auto focusing a camera module, the method comprising:
   presetting a prescribed Displayed Field of View (DFoV) of a lens of the camera module, the prescribed DFoV corresponding to a prescribed position of the lens;
   storing the prescribed DFoV in a memory;
   determining a current DFoV of the lens;
   comparing the current DFoV with the prescribed DFoV;
   determining a current position of the lens corresponding to the current DFoV, a position of the lens being changed according to DFoV of the lens; and
   adjusting focus of the lens based on the current position of the lens.

5. The method of claim 1, wherein the adjusting focus of the lens comprises adjusting the focus of the lens by distancing the lens from an image sensor of the camera module when the current DFoV is greater than the prescribed DFoV.

6. The method of claim 4, wherein the adjusting focus of the lens comprises adjusting the focus of the lens by placing the lens proximate to an image sensor when the current DFoV is smaller than the prescribed DFoV.

* * * * *